(12) United States Patent
Ramaswamy et al.

(10) Patent No.: US 8,486,573 B2
(45) Date of Patent: Jul. 16, 2013

(54) FREEING A FROZEN FUEL CELL COMPONENT

(75) Inventors: Sitaram Ramaswamy, West Hartford, CT (US); Kazuo Saito, Glastonbury, CT (US)

(73) Assignee: UTC Power Corporation, South Windsor, CT (US)

( * ) Notice: Subject to any disclaimer, the term of this patent is extended or adjusted under 35 U.S.C. 154(b) by 467 days.

(21) Appl. No.: 12/746,797

(22) PCT Filed: Dec. 21, 2007

(86) PCT No.: PCT/US2007/088484
§ 371 (c)(1),
(2), (4) Date: Jun. 8, 2010

(87) PCT Pub. No.: WO2009/082393
PCT Pub. Date: Jul. 2, 2009

(65) Prior Publication Data
US 2010/0261077 A1    Oct. 14, 2010

(51) Int. Cl.
*H01M 8/00* (2006.01)
(52) U.S. Cl.
USPC .......................................... 429/428; 429/433
(58) Field of Classification Search
USPC ................ 429/428, 433, 436, 437, 443
See application file for complete search history.

(56) References Cited

U.S. PATENT DOCUMENTS

| | | | |
|---|---|---|---|
| 6,428,919 B1 | 8/2002 | Takahashi | |
| 2002/0146602 A1 | 10/2002 | Abe | |
| 2004/0229099 A1* | 11/2004 | Standke et al. | 429/26 |
| 2005/0249992 A1* | 11/2005 | Bitoh | 429/24 |
| 2007/0212037 A1 | 9/2007 | Koenekamp | |

FOREIGN PATENT DOCUMENTS

| | | | |
|---|---|---|---|
| EP | 1811181 A | | 7/2007 |
| WO | WO 03/069955 | * | 8/2003 |
| WO | WO0306955 | | 8/2003 |

OTHER PUBLICATIONS

WO 03/069955 A (Dartmouth College [US]; Petrenko Vicotr [US]) Aug. 21, 2003 cited in the application.*
Search Report and Written Opinion mailed on Sep. 1, 2008 for PCT/US2007/088484.
Notification of Transmittal of the International Preliminary Report on Patentability mailed on Jul. 8, 2009 for PCT/US2007/088484.

* cited by examiner

*Primary Examiner* — Mark F Huff
*Assistant Examiner* — Monique Wills
(74) *Attorney, Agent, or Firm* — Carlson, Gaskey & Olds PC

(57) ABSTRACT

An example fuel cell component includes an energizeable coating on at least a portion of a surface of the fuel cell component. A controller is configured to energize the energizeable coating to break a bond between any ice and the surface of the fuel cell component.

20 Claims, 2 Drawing Sheets

FREEING A FROZEN FUEL CELL COMPONENT

TECHNICAL FIELD

This disclosure relates generally to fuel cells and more particularly to addressing fuel cell component movement in cold conditions.

DESCRIPTION OF RELATED ART

Fuel cell power plants and assemblies are well known. One prominent example fuel cell power plant includes a polymer electrolyte membrane (PEM). A PEM fuel cell power plant is derived from inclusion of the PEM within a membrane electrode assembly (MEA) positioned between flow field plates. An example fuel cell utilizes supplies of a hydrogen rich fuel and air, and may generate liquid and vapor water as byproducts. The fuel cell power plant includes one or more fuel cell stack assemblies (CSA), which include multiple individual fuel cells. Components within the fuel cell power plant include moveable parts such as valves, pumps, and blowers, as well as other balance of plant equipment.

One of the more important applications for PEM type fuel cell power plants is in transportation. As would be expected, these transportation power plants are subject to significant changes weather conditions. Of special concern are freezing conditions, which may result in the power plant being subject to sufficiently low temperatures causing water or other fluids within various movable components of the power plant to freeze. When the components within the power plant freeze, ice may bond to some of the part surfaces and prevent them from moving. Freezing conditions cause real problems for a non operating fuel cell power plant that is required to startup. If ice is present at startup and one or more components is frozen in position, the fuel cell may not be able start at all or only operate briefly because it is unable to reach a sustainable operating mode by generating sufficient thermal energy.

Typical approaches for unfreezing frozen fuel cell components involve heating the entire power plant assembly. This requires additional heaters and related components that increase costs. Providing the thermal energy required to melt ice within the entire power plant also can require substantial time and energy input. Such a requirement for substantial time and energy is impractical for most and if not all transportation applications.

Therefore it would be desirable to have an efficient and economical technique for dealing with ice within a fuel cell power plant.

SUMMARY

An example fuel cell part with at least one movable component subject to freezing conditions includes an energizeable coating on at least a portion of a surface of the fuel cell part, typically the moveable component. A controller is configured to energize the energizeable coating to break a bond between any ice and the surface of the fuel cell component.

An example fuel cell part includes a first fuel cell component and a second fuel cell component. A controller is configured to energize an energizeable coating on a portion of the first fuel cell component. The controller is configured to cause a relative movement between the first fuel cell component and the second fuel cell component in association with energizing the energizeable coating.

An example method of enabling movement of the fuel cell component includes heating a surface of the fuel cell component and causing relative movement between the fuel cell component and another fuel cell component. At least the heating or causing relative movement breaks a bond between ice and the surface of the fuel cell component.

The various features and advantages of the disclosed example will become apparent to those skilled in the art from the following detailed description. The drawings that accompany the detailed description can be briefly described as follows.

DETAILED DESCRIPTION

Figure 1:
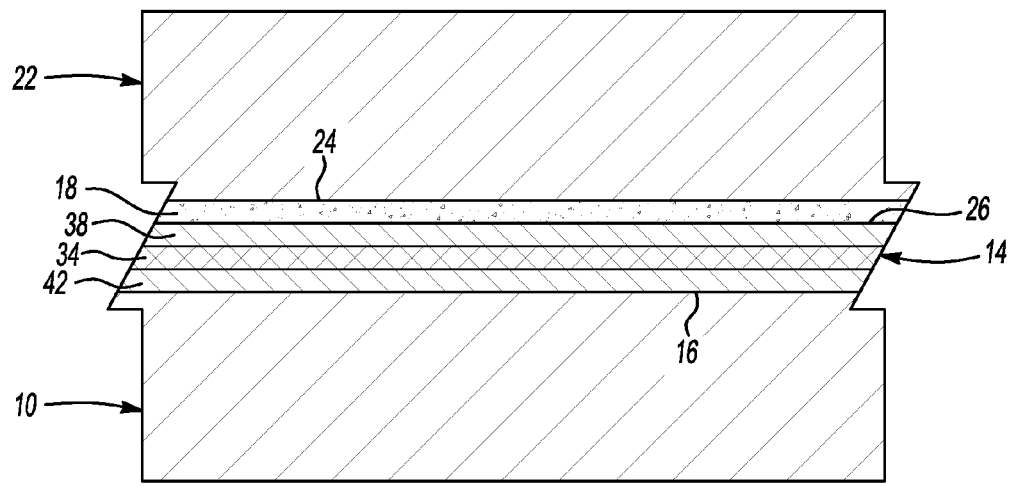
FIG. 1 schematically illustrates an example fuel cell component in a locked position relative to a second fuel cell component.

An example first fuel cell component 10 includes an energizeable coating 14 on a surface 16, as shown in FIG. 1. A layer of ice 18, which may form in sufficiently cold conditions, prevents relative movement between the first component 10 and a second fuel cell component 22. In this example, the second component 22 is moveable relative to the surface 16. The layer of ice 18 bonds to respective surfaces 16 and 24 of the components 10 and 22. When bonded, the layer of ice 18 prevents relative movement between the components 10 and 22, freezing the second component 22 in position relative to the first component 10.

Energizing the coating 14 produces heat that at least partially melts a portion of the layer of ice 18. Melting some of the ice 18 at the interface 26 between the ice 18 and the component surface 16 on the first fuel cell component 10 weakens the bond between the layer of ice 18 and the first component 10. When the bond is sufficiently weakened, initiating movement of the first component 10 relative to the second component 22 breaks the bond to allow at least some movement of the first component 10 relative to the second component 22.

In this example, the coating 14 need not generate enough heat for melting the entire layer of ice 18. Instead, the coating 14 generates enough heat to melt a portion of the layer of ice 18, which weakens the bond at the interface 26. In one example, a micro layer portion of the ice 18 at the interface 26 melts to break a bond between the ice 18 and the first component 10. The bond across the entire interface 26 weakens gradually as more of the layer of ice 18 melts. Initiating movement of the first component 10 relative to the second component 22 increases stress on the weakening bond and eventually breaks more of the bond. The remaining portions of the layer of ice 18 eventually melt or are otherwise removed as a result of the first component 10 moving relative to the second component 22, fuel cell operation, or both.

In one example, the first component 10 moves rotationally relative to the second component 22, such as when the first component 10 is a fuel cell blower or pump blade and the second component 22 is an associated housing. In another example, the first fuel component 10 moves freely relative to the second fuel cell component 22, such as when the first fuel cell component 10 is a valve member and the second fuel cell component 22 is an associated seat or valve housing.

The coating 14 in the illustrated example is on the first fuel cell component 10. In another example, a second energizeable coating is provided on at least a portion of the second fuel cell component 22. When one component remains relatively stationary and an adjacent component moves relative to it, the former includes the coating 14.

Figure 2:
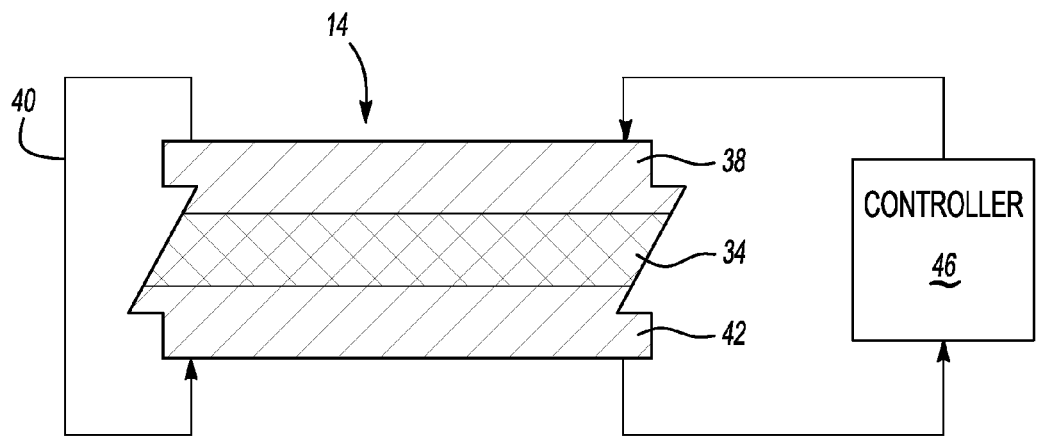
FIG. 2 shows a partial schematic of an example fuel cell component coating and a controller.

Referring now to FIG. 2, one example coating 14 includes a dielectric layer 34 positioned between a first conductive layer 38 and a second conductive layer 42. The dielectric layer 34 insulates the first conductive layer 38 and the second conductive layer 42. The conductive layers 38 and 42 are electrically coupled by a connection schematically shown at 40. A controller 46 controls electrical energy provided to the first conductive layer 38 and the second conductive layer 42 for selectively energizing the coating 14 to generate heat. The resistive properties of the example dielectric layer 34 facilitate heat generation. The controller 46 controls the supply of energy to the conductive layers 38 and 42. In one example, the controller 46 comprises a suitably programmed portion of an existing fuel cell system controller. Another example includes a dedicated controller 46.

The example energizeable coating 14 may include metal foils, such as stainless steel foil, titanium foil, copper foil and aluminum foil. In one example, a sputtering metal technique is used to deposit a metal. Other example coatings 14 include alloys, conductive oxides, conductive fibers, conductive paints, or a combination of two or more of these. One example the coating and configuration are disclosed in WO2003/069955. Given this description, those skilled in the art will be able to choose a coating to meet their particular needs.

Figure 3:
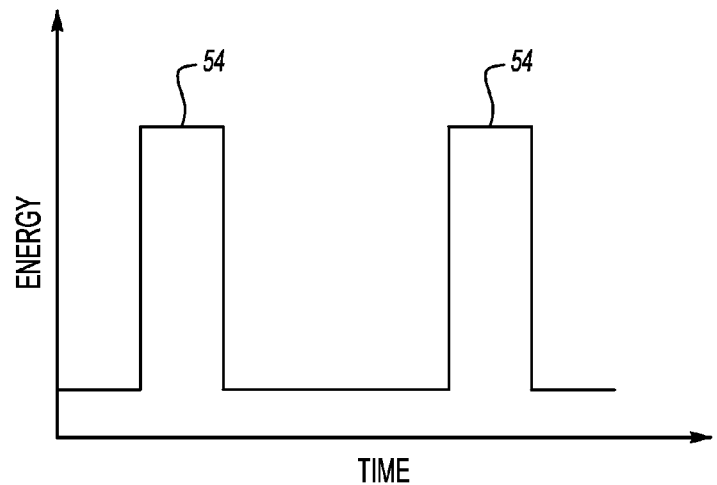
FIG. 3 graphically illustrates an energization technique for activating the example coating.

Controlling the supply of energy to the coating 14 controls the heat output from the coating 14. In the example of FIG. 3, the controller 46 directs at least one pulse 54 of electrical energy to the coating 14. The pulse 54 in one example has a duration of approximately 10 milliseconds. In this example, heat from the coating 14 operates very fast to cause at least enough ice melting at the interface 26 to facilitate breaking the bond between the ice 18 and the component 10. The challenge is to input a large quantity of energy in a short duration to weaken the bond enough to allow actuation of the component before the energy pulse can dissipate throughout the ice layer. Pulsing the energy facilitates control over how much heat is generated by the coating 14. If more heat is desired, more pulses 54 may be generated. Alternatively, the pulse durations may be longer. As shown, the controller 46 does not provide a sustained, drawn out supply of energy to the coating 14. Instead, the supply is short in duration to rapidly heat the component surface 16 and minimize consumed power while providing enough heat to sufficiently weaken the bond between the component 10 and the layer of ice 18, which releases the component 22.

Figure 4:
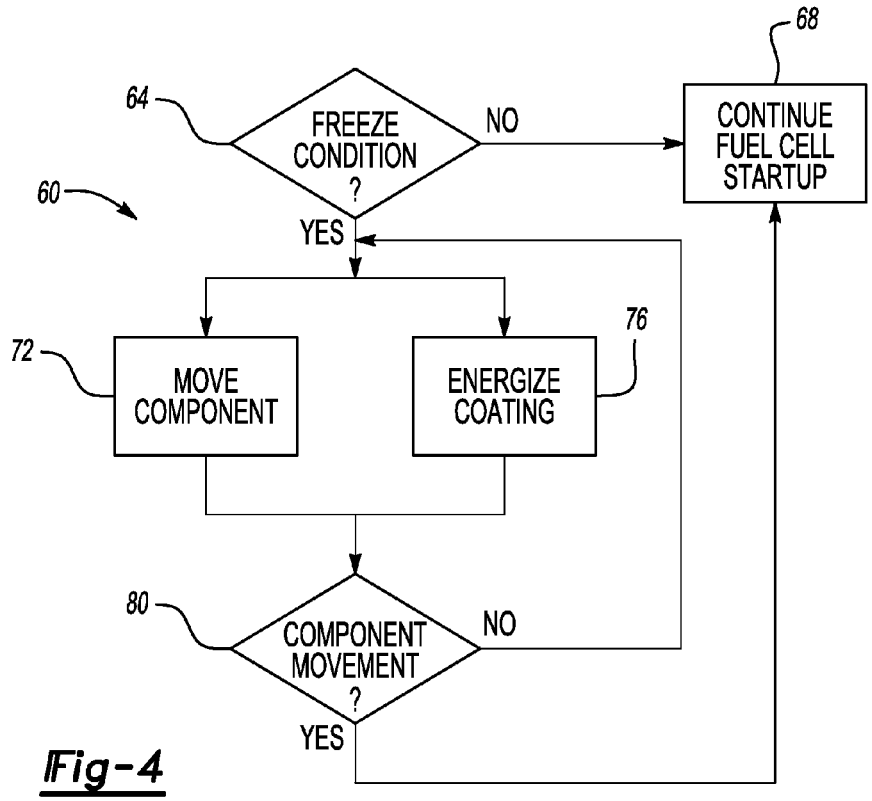
FIG. 4 is a flowchart diagram summarizing an example approach including energizing the coating and moving the fuel cell component.

FIG. 4 illustrates an example control strategy that includes attempting to move the component 22, and energizing the coating 14. This example is a fuel cell startup procedure 60. A determination is made at 64 if a fuel cell freeze condition exists in which the components 10 and 22 of the fuel cell are frozen in position relative to each other. In one example, thermal sensors (not shown) provide an indication whether ambient or other temperature conditions are conducive to the components 10 and 22 being frozen in position. In another example, the controller 46 is able to detect whether the component 22 is moveable or is frozen in position.

If a freeze condition does not exist, the procedure 60 continues with a normal start of the fuel cell at 68. If the component 22 is frozen in position, the controller takes action to break the ice bond that is holding the component 22 in place.

At 72, the controller 46 instigates movement of the component 22. In a blower blade example, the controller turns on the blower. In a valve example, the controller forces or allows fluid flow toward the frozen valve member.

The controller also energizes the coating 14 at 76 to melt at least a portion of the layer of ice 18 at the interface 26 to weaken the bond between the ice 18 and the component 10. One example includes a pulsing technique as shown in FIG. 3.

In one example, the controller 46 attempts the relative movement between the components 10 and 22 while, at the same time, energizing the coating 14 to melt a portion of the layer of ice 18. In another example, the controller initiates component movement at 72 before energizing the coating 14 at 76. Another example includes energizing the layer at 76 before instigating component movement.

The controller 46 in one example uses a failed attempt to move the component at 72 as indicative of a frozen condition.

At 80, the controller 46 determines if the component 22 is moveable relative to the component 10. If so, the startup procedure 60 continues at 68. If not, the startup procedure 60 includes repeating the steps of energizing the coating at 76 and initiating movement of the component at 72.

The disclosed example provides a fast and efficient technique for freeing a frozen fuel cell component. One advantage is that no external heaters are required. Another advantage is that little additional energy is required.

Although an example embodiment has been disclosed, a worker of ordinary skill in the art may recognize that certain modifications are possible and come within the scope of this disclosure. For that reason, the following claims should be studied to determine the true scope of legal protection available.

We claim:

1. A fuel cell component, comprising:
a fuel cell component surface; and
an energizeable coating on at least a portion of said fuel cell component surface, said energizeable coating being selectively energizeable to at least partially break a bond between any layer of ice and said portion of said fuel cell component surface.

2. The fuel cell component of claim 1, wherein said energizeable coating comprises a thin metal foil or a sputtered metal.

3. The fuel cell component of claim 2, wherein said thin metal foil comprises at least one of a stainless steel foil, a titanium foil, a copper foil, or an aluminum foil.

4. The fuel cell component of claim 1, wherein said energizeable coating comprises at least one of an alloy, a conductive oxide, conductive fibers, or a conductive paint.

5. The fuel cell component of claim 1, wherein said energizeable coating comprises a first electrically conductive layer, a second electrically conductive layer, and a dielectric layer having at least a portion disposed between the first and second electrically conductive layers.

6. The fuel cell component of claim 5, wherein said dielectric layer insulates at least a portion of said first conductive layer from said second conductive layer.

7. The fuel cell component of claim 5, wherein said second conductive layer is electrically coupled to said first conductive layer.

8. A fuel cell device, comprising:
a first fuel cell component;
a second fuel cell component;
an energizeable coating on a portion of said first fuel cell component;

a controller configured to energize said energizeable coating and to cause relative movement between said first fuel cell component and said second fuel cell component in association with energizing said energizeable coating.

9. The fuel cell device of claim 8, wherein said controller is configured to simultaneously energize said energizeable coating and to cause the relative movement.

10. The fuel cell device of claim 8, wherein said controller is configured to energize said energizeable coating and then cause the relative movement.

11. The fuel cell device of claim 8, wherein said controller is configured to simultaneously energize said energizeable coating after attempting to cause the relative movement.

12. The fuel cell device of claim 8, wherein said energizeable coating comprises an oxide coating.

13. The fuel cell device of claim 8, wherein said energizeable coating comprises a first electrically conductive layer, a second electrically conductive layer, and a dielectric layer having at least a portion disposed between the first and second electrically conductive layers.

14. The fuel cell device of claim 8, comprising a second coating on a portion of a surface of said second component that faces said first fuel cell component.

15. The fuel cell device of claim 14, wherein energizing said second coating breaks a bond between any layer of ice and said second component.

16. A method of enabling movement of a fuel cell component, comprising:

heating at least a portion of a surface of the fuel cell component with an energizeable coating; and causing relative movement between the fuel cell component and a second fuel cell component, wherein at least one of the heating or the movement at least partially breaks a bond between ice and the surface.

17. The method of claim 16, including energizing a coating on the portion to generate heat.

18. The method of claim 17, including initiating the relative movement while energizing the coating.

19. The method of claim 17, including initiating the relative movement after energizing the coating.

20. The method of claim 17, including initiating the relative movement before energizing the coating.

* * * * *